US010501164B2

(12) United States Patent
Schalla

(10) Patent No.: US 10,501,164 B2
(45) Date of Patent: Dec. 10, 2019

(54) UNMANNED INFLATABLE AIRCRAFT

(71) Applicant: James Schalla, Edmonds, WA (US)

(72) Inventor: James Schalla, Edmonds, WA (US)

( * ) Notice: Subject to any disclaimer, the term of this patent is extended or adjusted under 35 U.S.C. 154(b) by 538 days.

(21) Appl. No.: 15/013,644

(22) Filed: Feb. 2, 2016

(65) Prior Publication Data
US 2017/0217562 A1    Aug. 3, 2017

(51) Int. Cl.
*B64C 1/34* (2006.01)
*B64C 39/02* (2006.01)

(52) U.S. Cl.
CPC .............. *B64C 1/34* (2013.01); *B64C 39/024* (2013.01); *B64C 2201/027* (2013.01); *B64C 2201/101* (2013.01); *B64C 2201/108* (2013.01)

(58) Field of Classification Search
CPC ....................................................... B64C 1/34
USPC .................................................. 244/123.11
See application file for complete search history.

(56) References Cited

U.S. PATENT DOCUMENTS

| | | | | |
|---|---|---|---|---|
| 7,059,566 B2 * | 6/2006 | Byers | ...................... | B64C 1/061 244/119 |
| 7,306,187 B2 * | 12/2007 | Lavan | ...................... | B64B 1/14 244/123.11 |
| 8,746,620 B1 * | 6/2014 | Moussouris | ............ | H02S 10/40 244/123.1 |
| 8,931,739 B1 * | 1/2015 | Lutke | ........................ | B64C 1/34 244/119 |
| 9,067,668 B2 * | 6/2015 | Moussouris | .............. | B64C 1/34 |
| 2014/0203139 A1 * | 7/2014 | Moussouris | .............. | B64C 1/34 244/1 TD |
| 2015/0102159 A1 * | 4/2015 | Hegarty | ................ | B64C 39/024 244/17.23 |
| 2015/0314881 A1 * | 11/2015 | Tsaliah | ................... | B64D 17/72 244/146 |
| 2016/0307448 A1 * | 10/2016 | Salnikov | ................. | A01B 79/02 |
| 2017/0174338 A1 * | 6/2017 | Beckman | .............. | B64C 27/467 |

FOREIGN PATENT DOCUMENTS

| | | | | |
|---|---|---|---|---|
| CN | 204587296 U | * | 8/2015 | ............... B64C 1/06 |
| EP | 3013686 B1 | * | 4/2017 | |

* cited by examiner

*Primary Examiner* — Michael H Wang
(74) *Attorney, Agent, or Firm* — Mohr Intellectual Property Law Solutions, PC

(57) ABSTRACT

In one embodiment, an unmanned aircraft comprises a housing, an inflatable fuselage, three motors, and three propellers. The housing may comprise an enclosure configured to house one or more electrical components. The inflatable fuselage may comprise a first, a second and a third spindle each extending from the housing. The first motor may be coupled to a first propeller and mounted to the first spindle. The second motor may be coupled to a second propeller and mounted to the second spindle. The third motor may be coupled to a third propeller and mounted to the third spindle.

12 Claims, 8 Drawing Sheets

UNMANNED INFLATABLE AIRCRAFT

BACKGROUND

The present disclosure relates generally to unmanned aircraft. In particular, multi-rotor unmanned aircraft (e.g., drones) having an inflatable fuselage are described.

Known unmanned aircraft are not entirely satisfactory for the range of applications in which they are employed. For example, most multi rotor drones, especially larger drones greater than 40" in diameter, require large volumes to store and transport. This may incur issues for operators and additional shipping and storage costs for manufacturers and customers.

In addition, conventional unmanned aircraft typically rely on expensive and difficult to manufacture materials such as carbon fiber to provide the structural stiffness and low weight needed in aircraft materials.

Further, most conventional drones will sink if there is an emergency landing in water which results in a loss of the valuable payload. Additionally, conventional drones would do significant damage to an airplane engine it ingested. Finally, conventional "off the shelf" drones are typically not offered in a variety of colors and graphics.

Thus, there exists a need for unmanned aircraft that improve upon and advance the design of known unmanned aircraft. Examples of new and useful unmanned aircraft relevant to the needs existing in the field are discussed below.

SUMMARY

In one embodiment, an unmanned aircraft comprises a housing, an inflatable fuselage, three motors, and three propellers. The housing may comprise an enclosure configured to house one or more electrical components. The inflatable fuselage may comprise a first, a second and a third spindle each extending from the housing. The first motor may be coupled to a first propeller and mounted to the first spindle. The second motor may be coupled to a second propeller and mounted to the second spindle. The third motor may be coupled to a third propeller and mounted to the third spindle.

In one embodiment the first, second and third spindles are configured to extend outward from a central hub when inflated. In some embodiments, each of the spindles includes a proximal end attached to the central hub; and a distal end extending outward from the central hub. The housing may surround the central hub. In some embodiments, the housing comprises a first, a second, and a third port formed in the housing. The first port may be formed in the housing such that when inflated, the first spindle extends out from the first port. The second port may be formed in the housing such that when inflated, the second spindle extends out from the second port. The third port may be formed in the housing such that when inflated, the third spindle extends out from the third port.

A first mounting bracket may be attached to the distal end of the first spindle. The first mounting bracket may comprise a first motor attachment platform; and a first clamping mechanism configured to clamp to time distal end of the first spindle, thereby attaching the first mourning bracket to the first spindle.

A second mounting bracket may be attached to the distal end of the second spindle. The second mounting bracket may comprise a second motor attachment platform; and a second clamping mechanism configured to clamp to the distal end of the second spindle, thereby attaching the second mounting bracket to the second spindle.

A third mounting bracket may be attached to the distal end of the third spindle. The third mounting bracket may comprise a third motor attachment platform; and a third clamping mechanism configured to clamp to the distal end of the third spindle, thereby attaching the third mounting bracket to the third spindle.

The first motor may be coupled to a first propeller and mounted to the first mounting bracket. The second motor may be coupled to a second propeller and mounted to the second mounting bracket. The third motor may be coupled to a third propeller and mounted to the third mounting bracket.

The unmanned aircraft may further comprise a fourth mounting bracket attached to the distal end of the fourth spindle; and a fourth motor coupled to a fourth propeller and mounted to the fourth mounting bracket.

The first, second and/or third spindles may contain a compressed gas at a pressure of 10 to 150 psig. The first, second and/or third spindles may contain a compressed gas at a pressure of 15 to 100 psig. The first, second and/or third spindles may contain a compressed gas at a pressure of 20 to 60 psig. The first, second and/or third spindles may contain a compressed gas at a pressure of 25 to 50 psig.

The enclosure may house a battery, a flight controller, a radio receiver and speed controllers for each of the motors.

The fuselage may be comprised of a top sheet and a bottom sheet; and wherein a perimeter of the top sheet is joined to a perimeter of the bottom sheet, thereby forming a protruding seam on the inflatable fuselage. The perimeter of the top sheet may be folded back on itself and joined to the perimeter of the bottom sheet, thereby forming a conduit. The first clamping mechanism may be configured to clasp the protruding seam.

The first port may be configured to house the first mounting bracket when the first spindle is in a deflated condition.

DETAILED DESCRIPTION

The disclosed unmanned aircraft will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various unmanned aircraft are provided. Related features in the examples may be identical, similar, or dissimilar in different examples. For the sake of brevity; related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-5, a first example of an unmanned aircraft, drone 50, will now be described. The reader will appreciate from the figures and description below that drone 50 addresses shortcomings of conventional drones.

For example, drone 50 can be compactly stored and transported in a deflated state. Further, the fuselage of drone 50 may be produced quickly and at a significantly lower cost than conventional carbon fiber or plastic fuselages.

In addition, the inflatable fuselage of drone 50 may provide sufficient buoyancy to prevent drone 50 from submerging in water. Further, drone 50 may be less damaging to jet engines if ingested. Finally, drone 50 may easily be produced and sold in a variety of colors and graphics.

Figure 1:
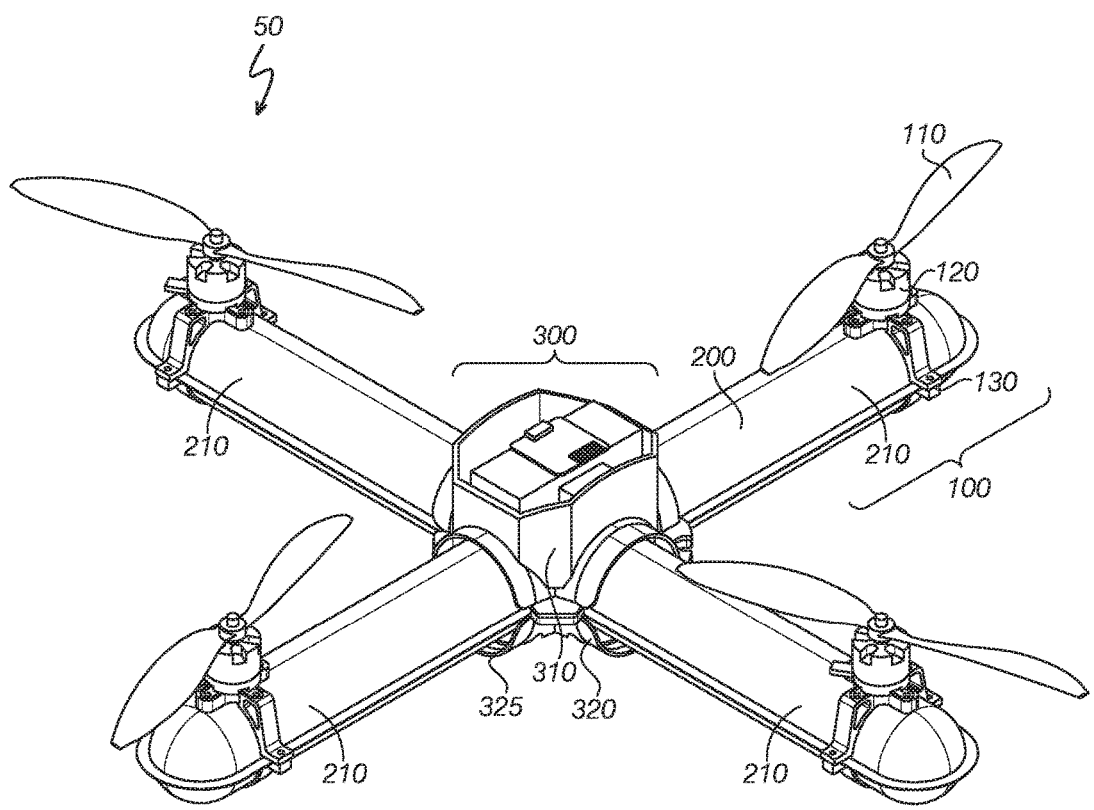
FIG. 1 is a perspective view of one embodiment of an unmanned aircraft.

Drone 50 includes a fuselage 200, a housing 300, and a plurality of motors 120 connected to the fuselage 200 via a plurality of mounting brackets 130. As can be seen in FIG. 1, the fuselage 200 comprises a plurality of spindles 210 extending laterally outward from the housing 300.

Each spindle 210 has a proximal end near the housing 300. Each spindle 210 has a distal end, opposite the proximal end. As used herein a "spindle" means a generally rod shaped inflatable structure configured to support a rotor, may have a circular cross section formed by laying two strips of flexible, gas-tight material one on top of the other and joining the edges and inflating to form a hallow tube. The distal end of each spindle 210 may support one of the motors 120 via a mounting bracket 130. Each motor 120 may drive a propeller 110.

In the illustrated embodiment, drone 50 includes a total of four spindles 210, each having a mounting bracket 130, motor 120, and propeller 110. In other embodiments, the drone may include a total of two spindles. In still other embodiments, the drone may include a total of three spindles. In still other embodiments, the done may include five, or more spindles.

Figure 2:
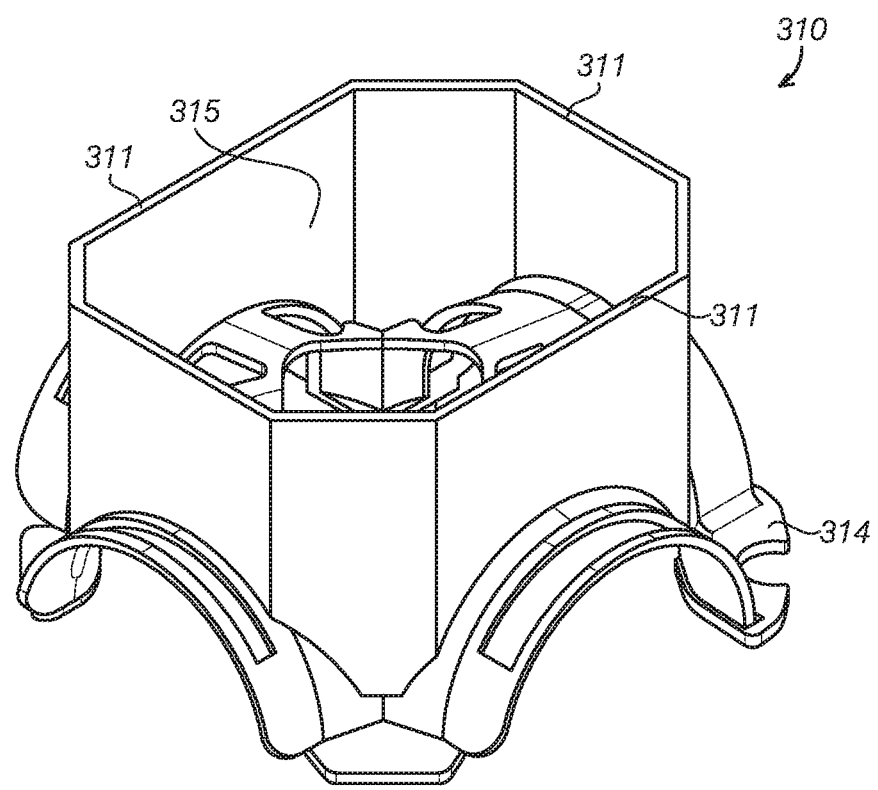
FIG. 2 is an exploded perspective view of a housing of the unmanned aircraft of FIG. 1.
Figure 2:
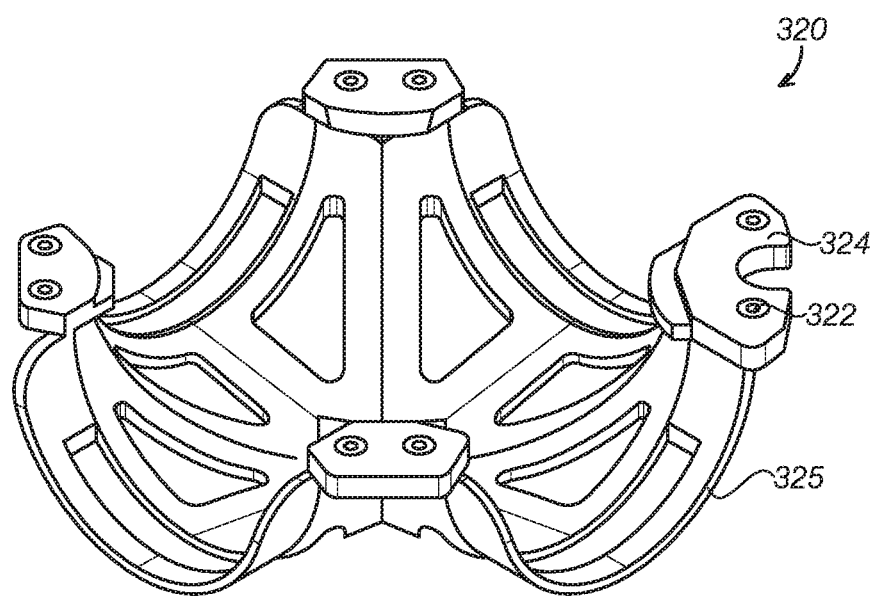

The proximal end of each spindle 210 extends through a respective port 325 on the housing 300. As can be seen in FIG. 2, the housing 300 may comprise an upper shell 310 and a lower shell 320. The lower shell 320 may include one or more a lower attachment faces 324. The lower attachment face 324 may include holes 322 configured to receive fasteners (e.g., screws). The upper shell 310 may include one or more upper attachment faces 314, being complementary to the lower attachment faces 324. The upper attachment face 314 may include holes (not shown) to match the holes 322 in the lower attachment face 324, and configured to receive fasteners.

Figure 5:
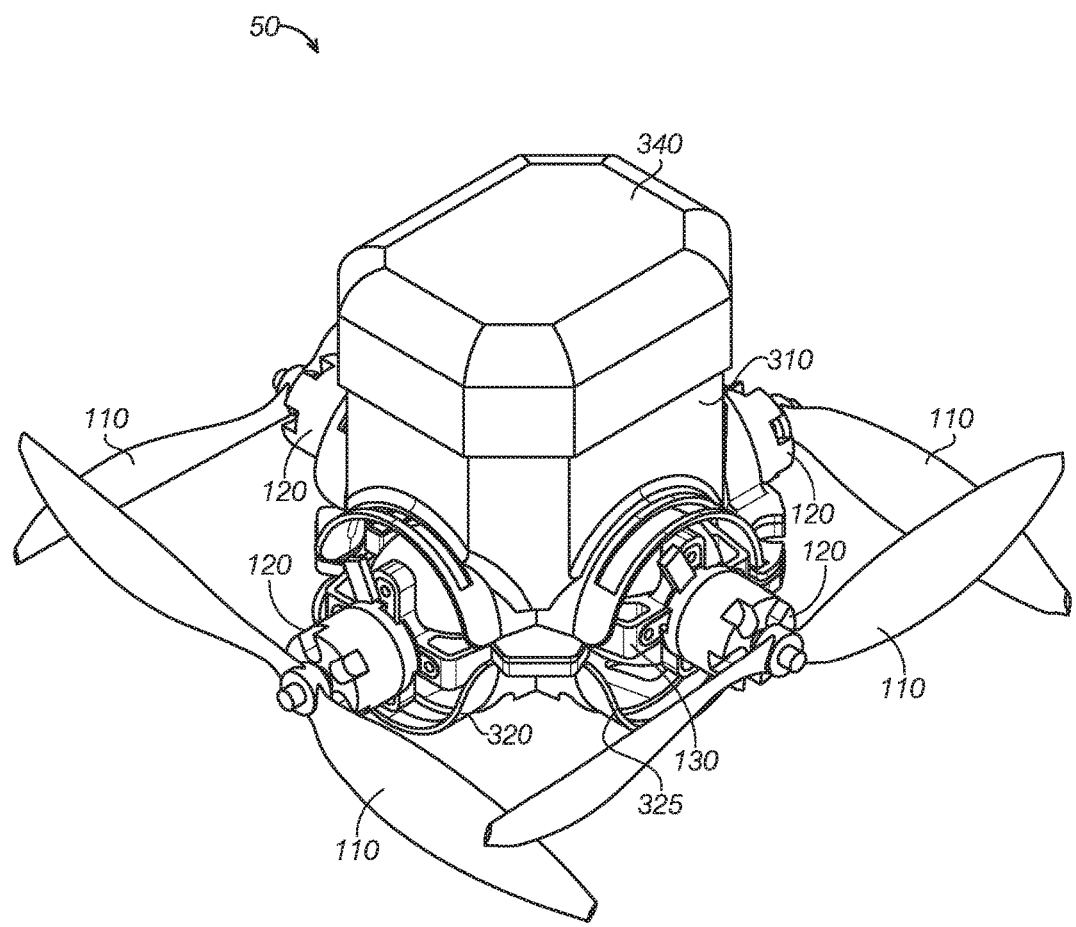
FIG. 5 is a perspective view of the unmanned aircraft of FIG. 1 showing the spindles in a deflated condition and the mounting brackets housed within the ports of the housing.

The upper shell 310 may include an enclosure 315 formed by walls 311. As can be seen in FIG. 5, the enclosure 315 may comprise a cap 340. The enclosure may house electrical components such as one or more batteries, flight controllers, radio receivers and/or speed controllers for each of the motors. In this regard the drone 50 may be operated via remote control.

Figure 3A:
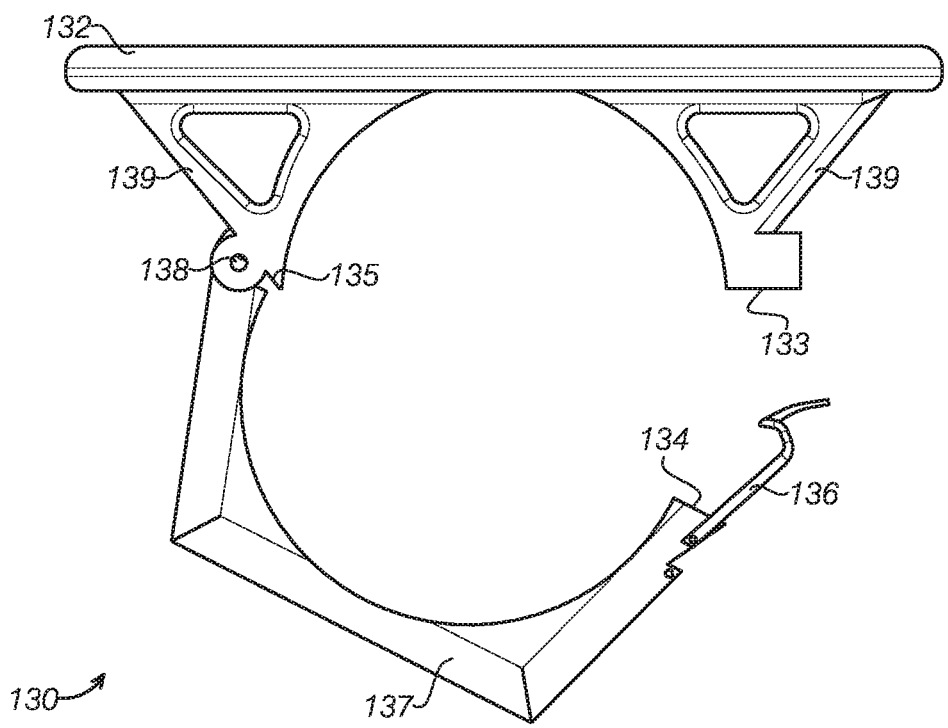
FIG. 3a is a side elevation view of mounting bracket of the unmanned aircraft of FIG. 1.
Figure 3B:
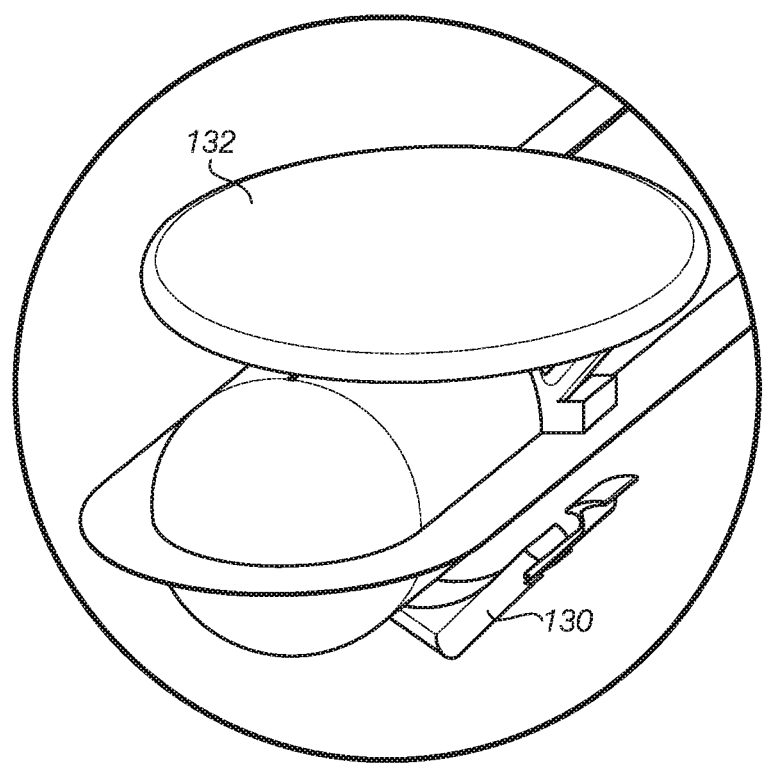
FIG. 3b is a perspective view of the mounting bracket being attached to a spindle of the unmanned aircraft t of FIG. 1.

Turning now to FIGS. 3a and 3b, one embodiment of a mounting bracket 130 is illustrated. In the illustrated embodiment, the mounting bracket 130 comprises a mounting platform 132 and a clamp arm 137 attached to the mounting platform 132 via a hinge 138 located at a first end of the clamp arm. As shown, the opposite end of the clamp arm 137 may include a clasp 136. The clasp 136 may secure the opposite end of clamp arm 137 to the underside of mounting platform 132, thereby allowing the mounting platform to be secured to the end of a fuselage spindle.

In one example, lower teeth 134 on the clamp arm 137 may interface with upper teeth 133 on the underside of mounting platform 132. As described below, the spindles of the fuselage may include a laterally protruding seem. Upper and lower teeth 133, 134 may function to grip the seem on the spindle, thereby fastening the mounting bracket 130 to the spindle more securely.

Mounting platform 132 may be configured to securely mount a motor 120 thereto. In this regard, mounting platform may include clasps, holes to receive fasteners, and/or other devices to securely mount the motor.

Figure 4:
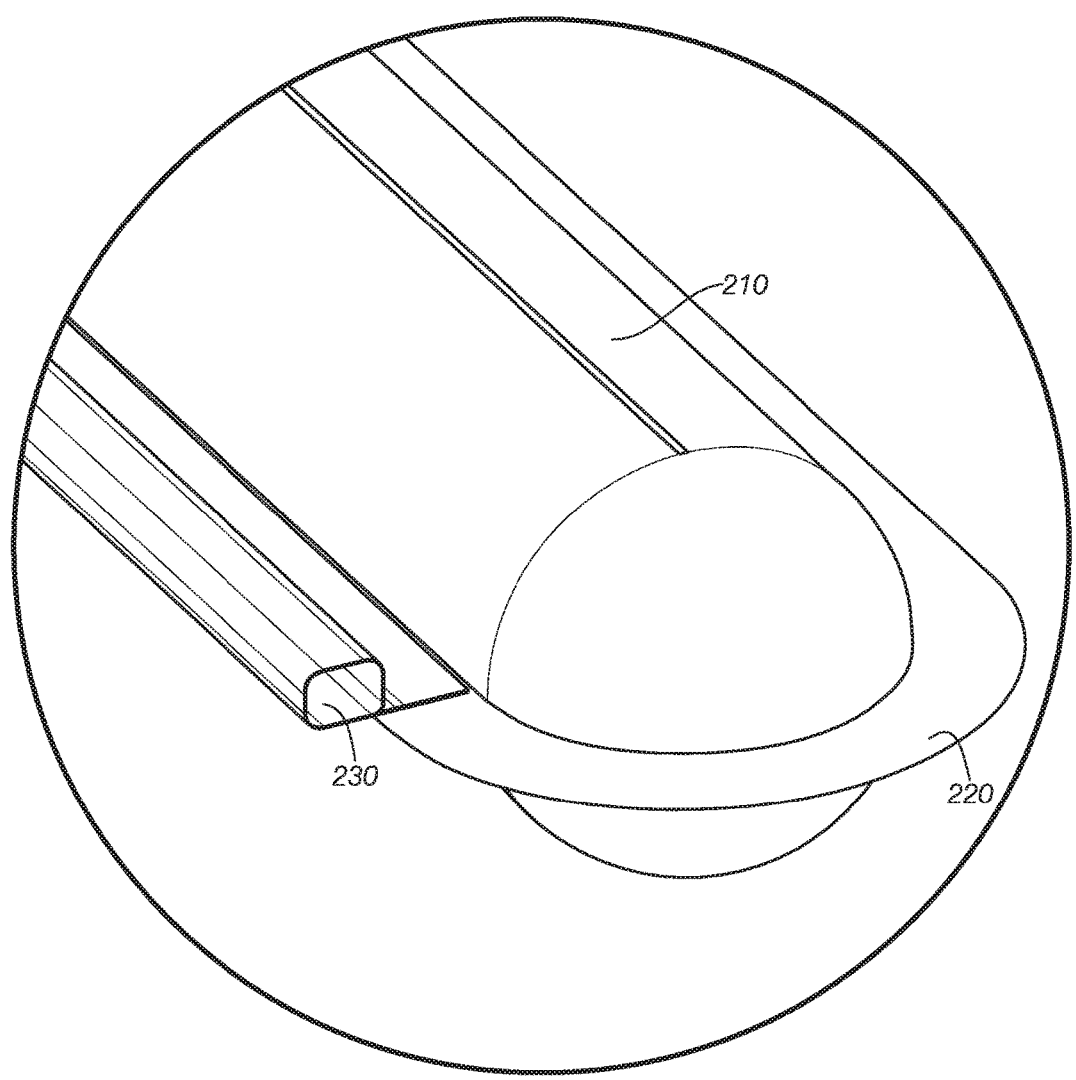
FIG. 4 is a detail perspective view of one embodiment of a spindle of an unmanned aircraft.

Turning now to FIG. 4, one example of the distal end of a spindle 210 is shown. The fuselage, including the spindle 210, may be formed by placing a first sheet of flexible material over a second sheet of flexible material and joining the two sheets at their perimeter via, for example, (radio frequency) welding. The resulting flexible tube may then be inflated to provide a structurally stable spindle. This manufacturing process may result in a laterally protruding seem 220. In some embodiments, an excess portion of flexible material of the top sheet (or alternatively the bottom sheet) may be folded back on itself and joined to the perimeter, thereby forming a conduit 230 as show in FIG. 4. Conduit 230 may be used to route power and/or control wires from the housing 300 to a motor 120 mounted oil the distal end of the spindle 210.

Turning now to FIG. 5, one embodiment of a drone 50 is illustrated. In the illustrated embodiment, the fuselage is in a deflated state. In this deflated configuration, the spindles of the fuselage may be stored inside the housing 300. Further, the mounting platforms 130 may be stored in their respective ports 325. In some embodiments, in order to configure drone 50 for flying, a user may simply inflate the fuselage via an inflation valve (not pictured), causing the spindles to inflate, thereby forcing the mounting platforms 130 out of the ports 325 and causing the spindles 210 to extend laterally from the ports 325.

Figure 9:
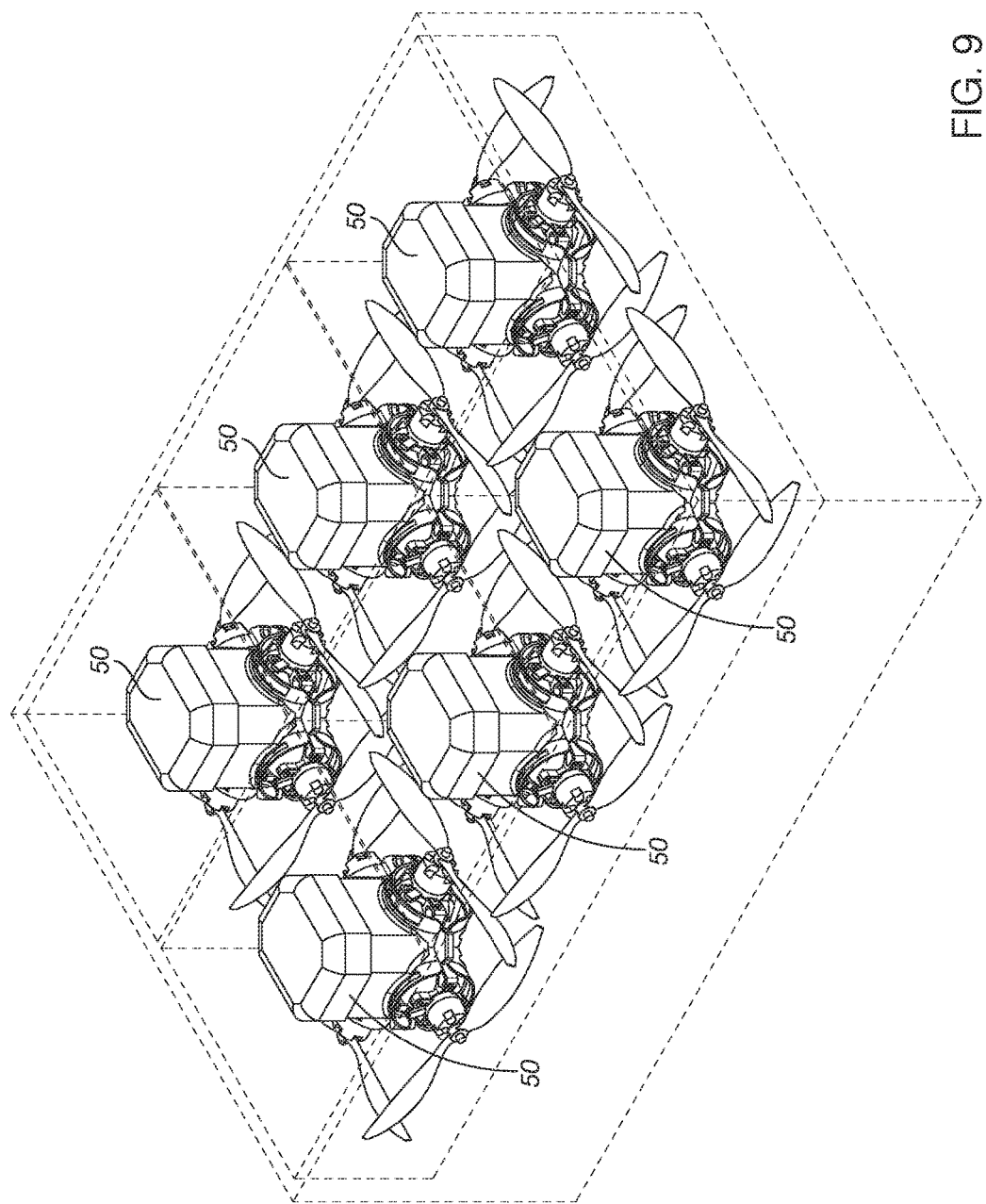
FIG. 9 is a perspective view of a plurality of unmanned aircraft, showing each of them with spindles in a deflated condition and the mounting brackets housed within their respective ports.

In some embodiments, the ports 325 and/or the mounting platforms 130 may be configured to be secured to one another. For example port 325 may include a slot or recess and mounting platform 130 may include a corresponding snag-fit tab. Other methods of temporarily securing mounting platform 130 inside port 325, such as simple friction fitting, threads and/or clasps, among others may be employed. Thus, in some embodiments, the spindles 210 of fuselage 200 may be deflated and the mounting brackets 130 may be secured in their respective ports for compact storage or transportation of one or more drones 50. For example, as shown FIG. 9, a plurality of drones 50 may thus be stored side by side.

In other embodiments, one or more spindles 210 may be inflated while at least one spindle 210 may be left in a deflated state inside the housing 300 with its respective mounting bracket 130 secured in the port 325. The motors and propellers corresponding to the deflated dies may be deactivated or removed. Thus, in this configuration, the drone 50 may be operated (e.g., flown via remote control) with one or more spindles in a deflated state. In this regard, the operator may configure the drone in any one of a multitude of configurations.

Figure 6:
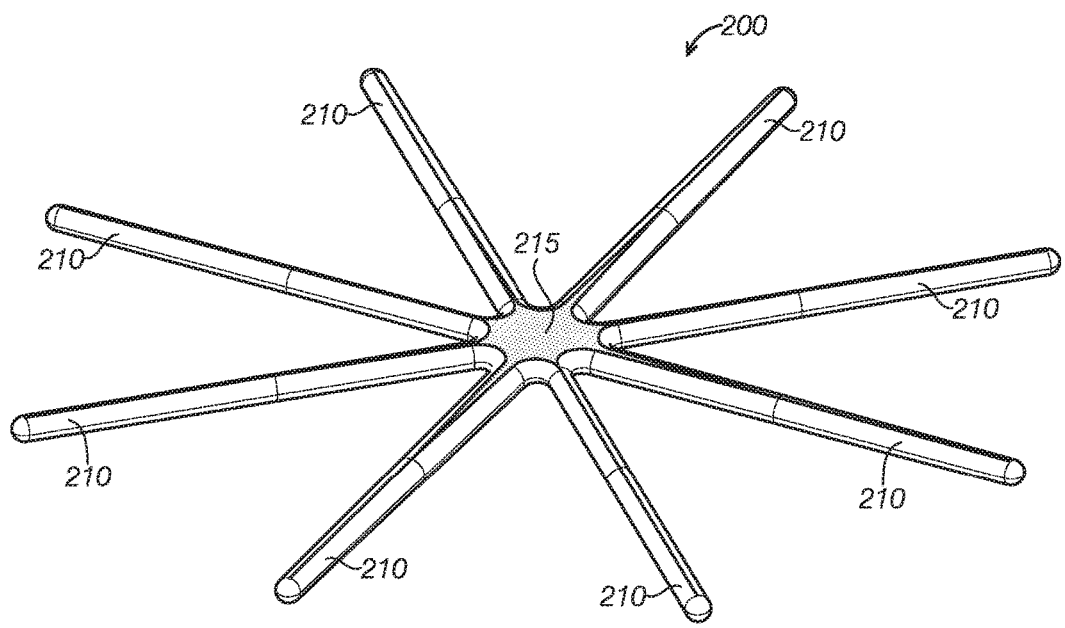
FIG. 6 is a perspective view of an inflatable fuselage of unmanned aircraft having eight spindles.

Turning now to FIG. 6, one embodiment of a fuselage 200 is shown. Fuselage 200 may include a plurality of spindles 210 extending from hub 215. As discussed above, fuselage 200 is inflatable. In this regard, fuselage 200 may be constructed from a flexible and air-tight material. When the drone is fully assembled and the fuselage inflated, hub 215 may be housed within housing 300.

In some embodiments, each spindle is in fluid communication with the hub, thus the pressure within each spindle and the hub may be essentially the same. In other embodiments, the spindles may be fluidly isolated from the each other and the hub. Thus, in some embodiments, each hub may have its own valve.

In one embodiment, the fuselage may comprise nylon coated with Thermoplastic Polyurethane (TPU). In other embodiments, the fuselage may comprise other flexible and gas-tight materials.

As discussed above, the fuselage may be filled with a compressed gas. In one embodiment, the compressed gas comprises air. In other embodiments, the compressed gas consists essentially of nitrogen. In still other embodiments the compressed gas consists essentially of carbon dioxide. In still other embodiments, the compressed gas may include one or more of argon, helium, hydrogen or other compressed gases.

In some embodiments, appropriate pressure within the fuselage (e.g., the pressure within the hub and/or within the s idles) may be a critical structural element of drone 50. In this regard, the pressure within the fuselage may be 10 to 150 psig. In other embodiments, the pressure within the fuselage is 15 to 100 psig. In other embodiments, the pressure within the fuselage is 20 to 60 psig. In other embodiments, the pressure within the fuselage is 25 to 50 psig.

In some embodiments, the air pressure within fuselage 200 may cause the fuselage to expand such that mounting brackets 130 constrict the distal ends of spindles 210. Thus mounting brackets 130 may be held snugly in place via the air pressure within fuselage 200. Similarly, the expansion of the fuselage may cause ports 325 of housing 300 to constrict the proximal ends of spindles 210. Thus, housing 300 may be held snugly in via in place via the air pressure within fuselage 200.

In the illustrated embodiment of FIG. 6, fuselage 200 has a total eight spindles 210 extending from hub 215. A hub having a corresponding eight ports may employed along with an eight-spindled fuselage to construct a drone having eight operational propellers. As the reader may appreciate, any other suitable number of spindles and ports may be employed as appropriate.

As discussed a one or more spindles may be placed in a deflated state in order to tailor the number of spindles and thus the number of operational propellers of drone 50. In this way, the drone 50 may be tailored by a user to a specific task.

Figure 7:
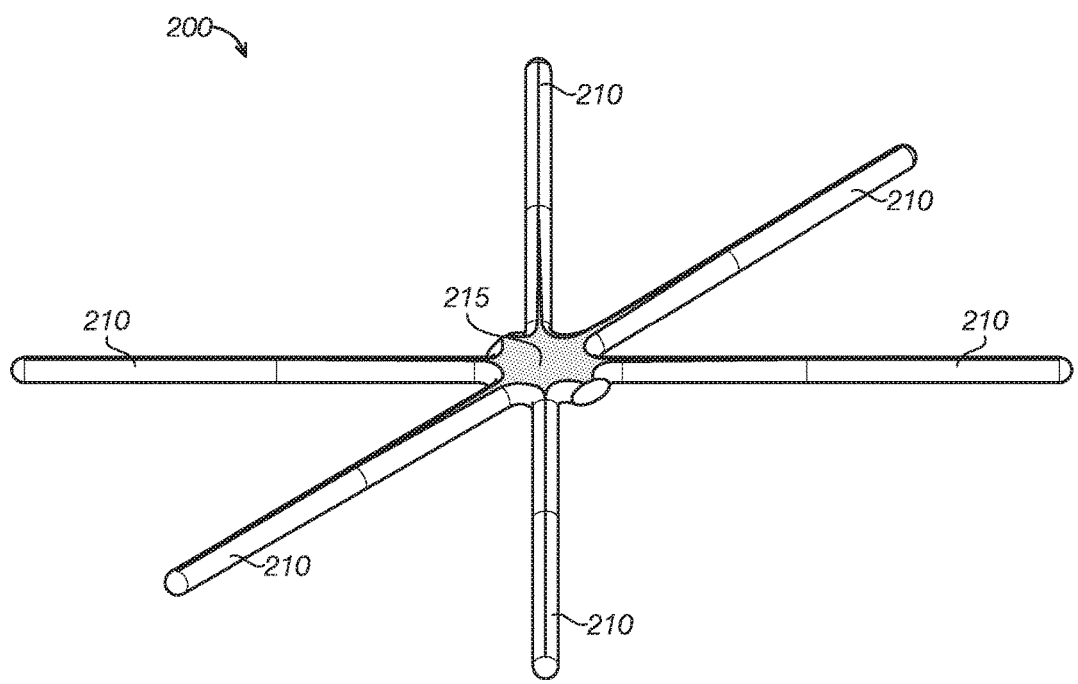
FIG. 7 is a perspective view of the inflatable fuselage or FIG. 6 showing of the spindles in a deflated condition.
Figure 8:
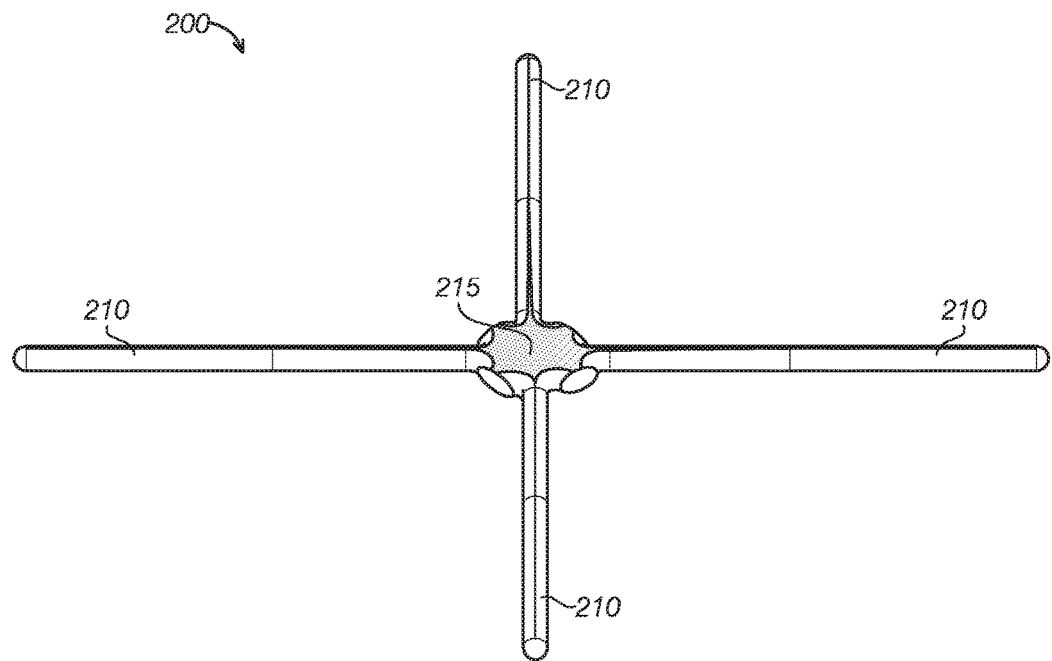
FIG. 8 is a perspective view of the inflatable fuselage of FIG. 6 showing four of the spindles in a deflated state.

As shown in FIG. 7, two spindles have been deflated to form a fuselage with six operational spindles. As shown in FIG. 8, four spindles have been deflated to form a fuselage with four operational spindles.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:
1. An unmanned aircraft, comprising:
  a fuselage comprising:
    a first, a second, and a third inflatable spindle configured to extend outward from a central hub when inflated, wherein each of the spindles includes:
      a proximal end attached to the central hub; and
      a distal end extending outward from the central hub;
  a housing surrounding the central hub, the housing comprising:
    an enclosure configured to house one or more electrical components;
    a first, a second, and a third port formed in the housing; wherein the first port is formed in the housing such that when inflated, the first spindle extends out from the first port; wherein the second port is formed in the housing such that when inflated, the second spindle extends out from the second port; and wherein the third port is formed in the housing such that when inflated, the third spindle extends out from the third port;
  a first mounting bracket attached to the distal end of the first spindle, the first mounting bracket comprising:
    a first motor attachment platform; and
    a first clamping mechanism configured to clamp to the distal end of the first spindle, thereby attaching the first mounting bracket to the first spindle;
  a second mounting bracket attached to the distal end of the second spindle; and
  a third mounting bracket attached to the distal end of the third spindle;
  a first motor coupled to a first propeller and mounted to the first mounting bracket;
  a second motor coupled to a second propeller and mounted to the second mounting bracket;

a third motor coupled to a third propeller and mounted to the third mounting bracket.

2. The unmanned aircraft of claim 1, wherein the inflatable fuselage comprises at least a fourth spindle configured to extend, when inflated, outward from the central hub.

3. The unmanned aircraft of claim 2, comprising:
a fourth mounting bracket attached to the distal end of the fourth spindle; and
a fourth motor coupled to a fourth propeller and mounted to the fourth mounting bracket.

4. The unmanned aircraft of claim 1, wherein the first, second and third spindles contain a compressed gas at a pressure of 10 to 150 psig.

5. The unmanned aircraft of claim 4, wherein the pressure of the compressed gas is 15 to 100 psig.

6. The unmanned aircraft of claim 4, wherein the pressure of the compressed gas is 20 to 60 psig.

7. The unmanned aircraft of claim 4, wherein the pressure of the compressed gas is 25 to 50 psig.

8. The unmanned aircraft of claim 1, wherein the enclosure houses:
a battery, a flight controller, a radio receiver and speed controllers for each of the motors.

9. The unmanned aircraft of claim 1, wherein the fuselage is comprised of a top sheet and a bottom sheet; and wherein a perimeter of the top sheet is joined to a perimeter of the bottom sheet, thereby forming a protruding seam on the inflatable fuselage.

10. The unmanned aircraft of claim 9, wherein the first clamping mechanism is configured to clasp the protruding seam.

11. The unmanned aircraft of claim 9, wherein the perimeter of the top sheet is folded back on itself and joined to the perimeter of the bottom sheet, thereby forming a conduit.

12. The unmanned aircraft of claim 1, wherein the first port is configured to house the first mounting bracket when the first spindle is in a deflated condition.

* * * * *